United States Patent

Benii et al.

[11] Patent Number: 4,812,726
[45] Date of Patent: Mar. 14, 1989

[54] SERVO CIRCUIT POSITIONING ACTUATOR

[75] Inventors: Toshihiko Benii; Kyosuke Yoshimoto, both of Hyogo, Japan

[73] Assignee: Mitsubishi Denki Kabushiki Kaisha, Tokyo, Japan

[21] Appl. No.: 3,798

[22] Filed: Jan. 16, 1987

[30] Foreign Application Priority Data

Jan. 16, 1986 [JP] Japan .................................. 61-8265
Jan. 28, 1986 [JP] Japan .................................. 61-18451

[51] Int. Cl.$^4$ ............................................. G05B 1/06
[52] U.S. Cl. ..................................... 318/640; 318/572; 318/652
[58] Field of Search ............... 318/480, 562, 572, 577, 318/601, 638, 640, 652, 664

[56] References Cited

U.S. PATENT DOCUMENTS

| | | | |
|---|---|---|---|
| 3,739,247 | 6/1973 | Yamaguchi et al. | 318/640 |
| 4,183,060 | 1/1980 | Barnette et al. | 318/662 X |
| 4,492,465 | 1/1985 | Erdmann et al. | 318/577 X |

FOREIGN PATENT DOCUMENTS

| | | | |
|---|---|---|---|
| 3214375 | 10/1983 | Fed. Rep. of Germany | 318/640 |
| 5923 | 2/1980 | Japan . | |
| 57-193818 | 11/1982 | Japan | 318/640 |
| 58-48104 | 3/1983 | Japan | 318/640 |
| 58-28653 | 6/1983 | Japan . | |
| 58-28654 | 6/1983 | Japan . | |
| 58-28655 | 6/1983 | Japan . | |
| 154336 | 8/1985 | Japan . | |
| 147936 | 8/1985 | Japan . | |
| 182521 | 9/1985 | Japan . | |

OTHER PUBLICATIONS

SPIE vol. 529, Optical Mass Data Storage (1985) "Improvement of Focusing and Tracking Servo in Optical Disk Memory" pp. 145-149, pub: 1985.

*Primary Examiner*—Bentsu Ro
*Attorney, Agent, or Firm*—Staas & Halsey

[57] ABSTRACT

A servo system for controlling the position of an object in accordance with a servo signal, employing an A/D converter to normalize an error in the position of the object and to enable digital correction of any offset in the system and digital compensation for track jumping and drop outs.

5 Claims, 6 Drawing Sheets

SERVO CIRCUIT POSITIONING ACTUATOR

BACKGROUND OF THE INVENTION

This invention relates to a servo circuit for normalizing error signals, such as one for controlling an optical spot in an optical disks such as found in, for example, video disks, compact disks and other such devices.

FIG. 1 is a block diagram of a conventional servo circuit which is used as an automatic tracking servo system in an optical disk device. In FIG. 1, reference numeral 16 designates a laser beam source for emitting, for instance, a beam generated by a semiconductor laser. A reflecting plate 17 deflects the laser beam emitted by the laser beam source 16 through 90° (i.e., to reflect the laser beam in the direction of the arrows). The reflecting plate 17 can be rotated about a rotating shaft 18. Photo detectors 19 and 20 receive a laser beam reflected by the reflecting plate 17 and output respective photoelectric curents corresponding to quantities of light received. The photodetectors 19 and 20 are disposed on either side of the central axis of the laser beam, which axis is indicated by a dot-dash line in FIG. 1. Current to voltage converters 21 and 22 respectively convert the photoelectric currents output by the photodetectors 19 and 20 into voltage signals. The photodetectors 19 and 20 together with the current to voltage converters 21 and 22 comprise a detector means.

A differential amplifier unit or signal processing means 23 respectively receives at input terminals 10 and 11 the voltage signals provided by the converters 21 and 22. The voltage signals are applied to a differential amplifier 12 and an adder 13. The output of the amplifier 12 and the output of the adder 13 are applied to an analog division unit 14, which provides, at an output terminal 15, a servo signal. In response to the servo signal from the analog division unit 14, a control unit 24 controls a motor 25 so as to control the rotational angle of the reflecting plate 17 and to keep the central axis of the laser beam midway between photodetectors 19 and 20. The rotating plate 17, rotating shaft 18, motor 25 and control unit 24 comprise a position actuator means.

The operation of the above servo circuit is described below. The laser beam from the laser beam source 16 is reflected by the reflecting plate 17 and received by the two photodetectors 19 and 20. The photodetectors 19 and 20 output respective photo electric currents varying in response to the quantity of light received. The photoelectric currents are converted into voltage signals by the current to voltage converters 21 and 22, respectively. These voltage signals are then applied to the differential amplifier unit 23. In the differential amplifier unit 23, the differential amplifier 12 provides a difference output, which indicates for instance, a shift of the optical axis from the disk track. The adder 13 provides a total detection output, i.e., a sum output. In the analog division unit 14, the sum output of the adder 13 divides the difference output of the differential amplifier 12, to provide a servo signal with a normalized output level. The output of the analog division unit 14 is applied to the control unit 24 to drive the motor 25 so that the optical axis is kept on the division line between the photodetectors 19 and 20.

The servo circuit described above is a tracking servo circuit. A focusing servo circuit has substantially the same circuit arrangement as the tracking servo circuit, and is used for moving an objective lens vertically to focus it on an object.

The above servo circuit requires an expensive analog division unit for normalization, i.e., division. Furthermore, an analog signal is normalized, and therefore drifts or changes greatly with time due to, for example, time and temperature induced changes in the analog circuit components. Thus, the servo circuit has rather low reliability.

In addition, because the above servo circuit comprises analog circuits, offset quantities (i.e., the difference between the position indicated by the photodetector and the actual position of the optical spot) must be eliminated. Such errors arise from optical system assembly errors or the like. The elimination of such errors requires adjustments to be performed for every servo circuit by applying a voltage through a variable resistor or the like to the circuit. Thus, the abovedescribed servo circuit has poor accuracy and instability, and is affected by temperature changes and time.

SUMMARY OF THE INVENTION

It is an object of the present invention to eliminate the above-described difficulties.

Another object of the present invention is to provide a servo circuit which is inexpensive to manufacture, has high reliability, and has stable operation over time.

A further object of the present invention is to provide a servo circuit in which the servo signal is digitized so that offset quantities are automatically detected, stored and corrected; thus, improving the accuracy and stability of the circuit.

A preferred embodiment of the servo circuit of the present invention comprises a normalizing means including an analog-to-digital converter (hereinafter "A/D converter") which receives an analog difference output from error sensors (i.e., photodetectors), and an analog sum output from the error sensors which functions as a reference input to the A/D converter. The A/D converter operates to digitize and to normalize the error signal.

An embodiment of the servo circuit of the present invention also includes a time division switching means which performs time division processing so that a signal A/D converter digitizes and normalizes the error signals for a plurality of servo systems.

In the servo circuit of the present invention an A/D converter and a digital-to-analog converter (hereinafter "D/A converter") are inserted in the main loop of a servo system to digitize the servo signal, so that the signal can be readily stored and digitally processed. Also included are a signal generating means and an offset correcting means which automatically detect, store and correct the offset of the error detectors. In particular, the output signal of the signal generating means is applied to the servo system to excite an object to be controlled, and at the peak of the sum output of the error detectors, the offset is detected from the output of the A/D converter and held. The detected offset is applied to the servo system at all times to automatically compensate for the detected offset.

Another embodiment of the servo circuit of the present invention includes, in addition to the abovedescribed circuit elements, a memory means for storing the servo signal in synchronization with the rotation of the disk, and for applying this stored servo signal to the servo system through a switching means. As discussed above, the circuit of the present invention compensates for any offset. Furthermore, the amount of track eccentricity and the amount of wow associated with the disk are stored in the memory means in synchronization with rotation of the disk. This data is continuously updated so that when the servo signal is irregular due to a track jump or drop out, the data stored in the memory means is applied, as a servo signal, to the servo system through the switching means; thus, preventing the object from moving out of the sensing range of the detectors.

BRIEF DESCRIPTION OF THE DRAWINGS

In the accompanying drawings.

DETAILED DESCRIPTION OF THE PREFERRED EMBODIMENTS

Figure 1:
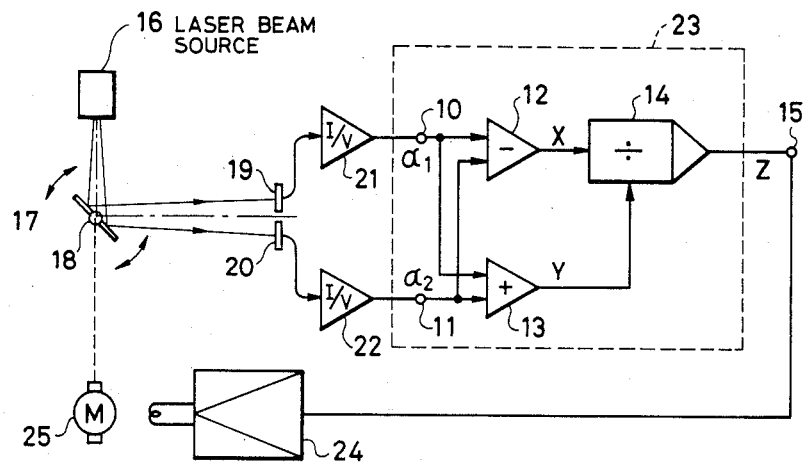
FIG. 1 is a block diagram of a conventional servo circuit.

The preferred embodiments of the present invention will be described with reference to FIGS. 2–7, in which parts that functionally corresponding to those which have been described with reference to FIG. 1 are identified with corresponding reference numerals or characters.

Figure 2:
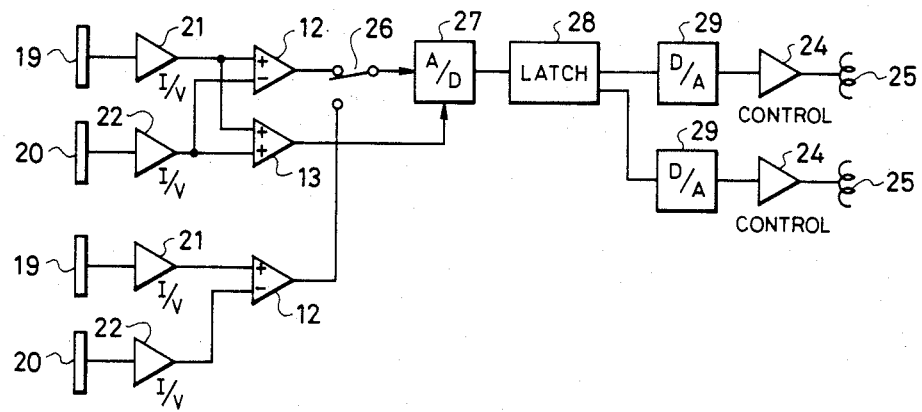
FIG. 2 is a block diagram of a first embodiment of the servo circuit according to the present invention.

FIG. 2 is a block diagram of a first embodiment of the servo circuit according to the present invention. In FIG. 2, reference numeral 26 designates a switch for selecting the difference outputs of one of the operational amplifiers 12 on a time division basis. A normalizing means (e.g., an A/D converter 27) converts the difference signal (analog signal) provided through the switch 26 into a digital signal, using the sum output of the operational amplifier 13 as a reference voltage. A latch circuit 28 comprising flip-flop circuits stores the output of the A/D converter 27. D/A converters 29 convert the digital signals held in the latch circuit 28 into an analog signal. The operational amplifiers 12, adder 13, A/D converter 27, switch 26, latch 28 and D/A converters 29 constitute a signal processing means.

The operation of the FIG. 2 servo circuit is described as follows. In the servo circuit, either a focus error signal or a tracking error signal is selected by the switch 26 on a time division basis. The selected signal is converted into digital form by the A/D converter 27. The A/D converter 27 functions to digitally divide the error signal (difference signal) by the sum signal. The output of A/D converter 27 is, therefore, a normalized signal which is stored in the latch circuit 28. The output of the latch circuit 28 is converted into analog form by the D/A converters 29, the outputs of which are applied through respective drive circuits 24 to control the corresponding motors 25.

Figure 3:
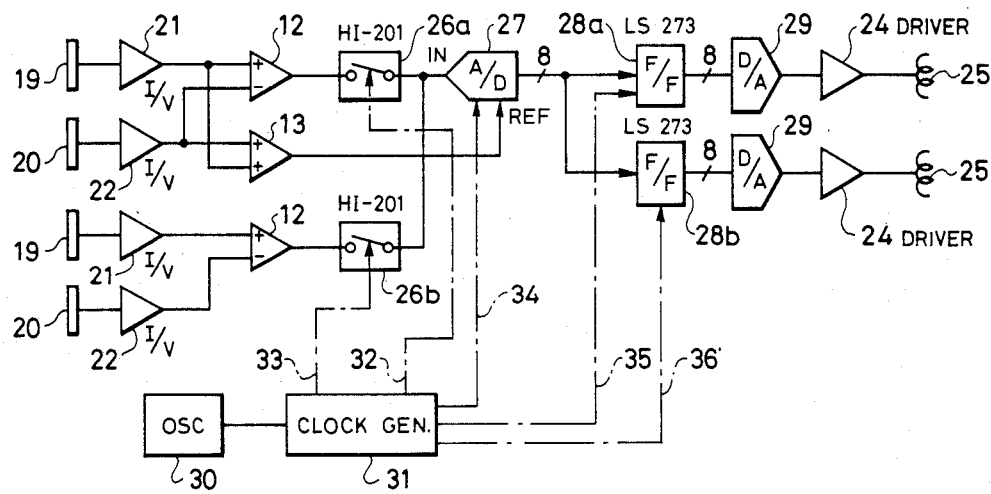
FIG. 3 is a more detailed block diagram of the FIG. 2 embodiment.
Figure 4:
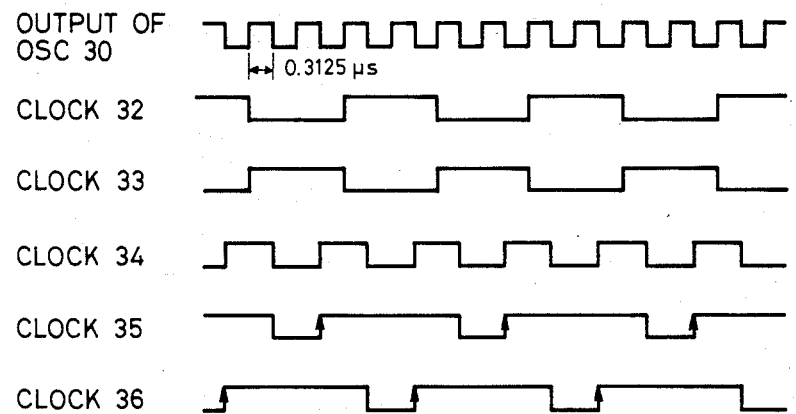
FIG. 4 is a timing diagram for the operation of the FIG. 3 circuit.

FIGS. 3 and 4 are respectively, a block diagram and a time chart for describing the details of the operation of the first embodiment of the servo circuit of the present invention. In FIG. 3, reference numeral 30 designates an oscillation circuit which oscillates at, for example, 1.6 MHz and has a pulse width of 0.3125 $\mu$s. A clock pulse generating circuit 31, frequency divides the output of the oscillation circuit 30. The clock pulse generating circuit 31 provides: switching clock pulses 32 and 33 which have frequencies higher than the frequency band of the servo circuit and are opposite in phase to each other; sampling clock 34; and latch clock pulses 35 and 36 which are synchronous with the switching clock pulses 32 and 33.

The switch 26 shown in FIG. 2 comprises analog switches 26a and 26b (FIG. 3) which are connected between the analog input terminal of each of the A/D converter 27 and the difference output terminal of the operational amplifiers 12. The switches 26a and 26b are operated by the switching clock pulses 32 and 33, respectively. The latch circuit 28 of FIG. 2 comprises flip-flops 28a and 28b (FIG. 3) which are connected between the output terminal of the A/D converter 27 and the respective input terminals of the D/A converters 29 of the illustrated servo systems. The flip-flops 28a and 28b are operated by the above-described latch clock pulses 35 and 36, respectively. The analog switches 26a and 26b, the flip-flops 28a and 28b, the oscillation circuit 30 and 31, form a time division switching means.

In the FIG. 3 embodiment, analog switches 26a and 26b. can comprise part number HI-201 manufactured by Harris Co.; the A/D converter 27 can comprise product number MP7683 (8 bits) manufactured by Micropower Systgems Co.; the flip-flops 28a and 28b can comprise product number SN74LS273 manufactured by TI Co.; and the D/A converter 29 can comprise a product number DAC08 manufactured by PMI Co. Further, in FIG. 3, the operational amplifiers 12, 13, 21 and 22 can comprise product number LF 412 manufactured by National Semiconductor Co.; and the control circuits can comprise the above-described operational amplifiers or similar circuits with transistors.

Figure 5:
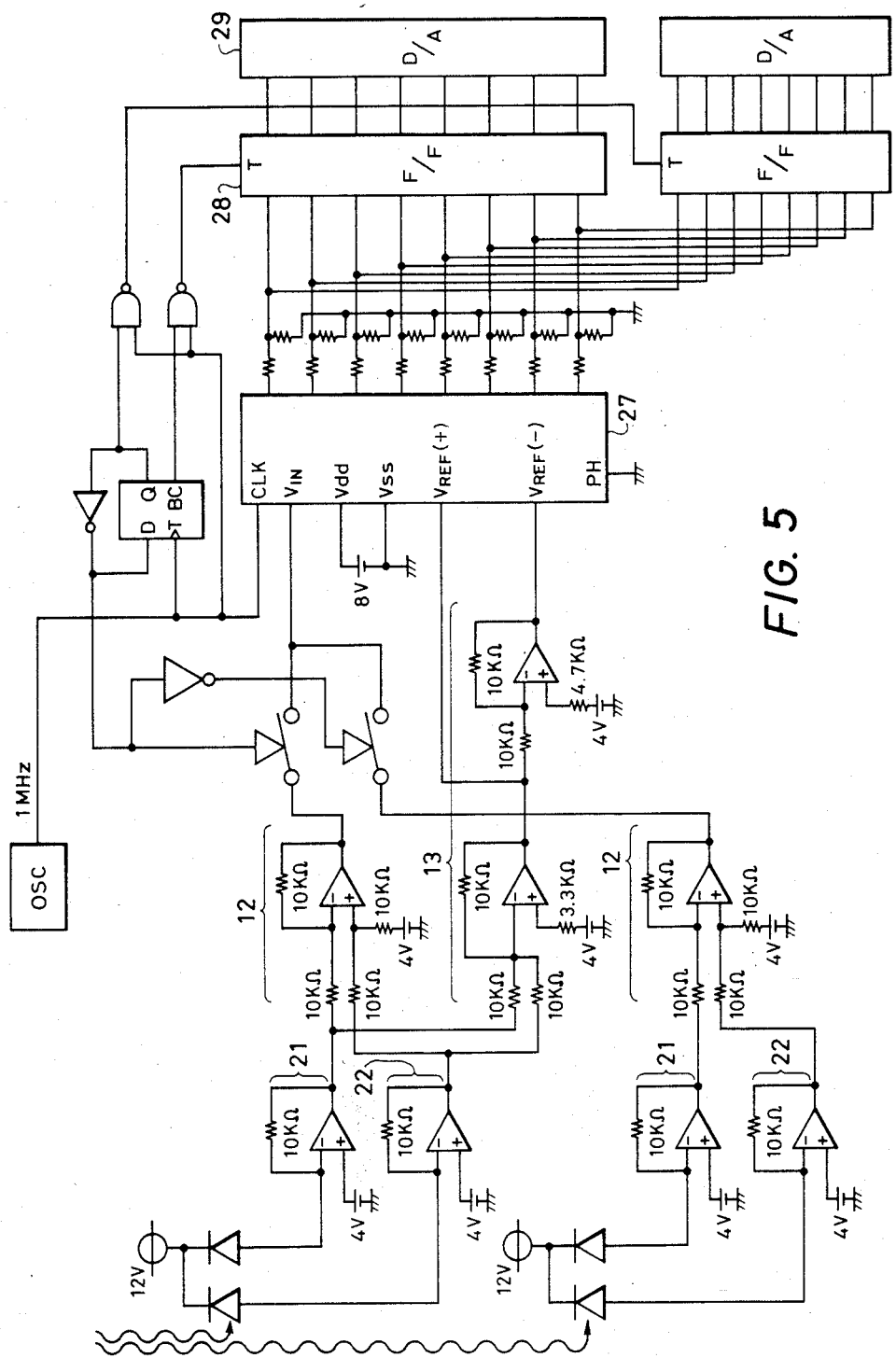
FIG. 5 is a detailed circuit diagram for the FIG. 2 embodiment.

A detailed circuit diagram of the FIG. 2 embodiment is as shown in FIG. 5. The operation of the FIG. 3 circuit is described below with reference to FIG. 4.

The analog switch 26 selects the focus error signal from the upper differential amplifier 12 in FIG. 3, which signal is then sampled by the A/D converter 27. After the A/D conversion, the output of the A/D converter 27 is stored in the latch circuit 28a. This path forms a focusing servo circuit. More particularly, the focus error signal (difference signal output of the upper operational amplifier 12) is applied to the input terminal of the A/D converter 27 and the output of the operational amplifier 13 (sum signal) is applied to the reference terminal of the A/D converter 27. The output of the A/D converter 27 is the normalized focus error signal.

Similarly, in the next cycle, after the analog switch 26 is operated to select the tracking error signal (e.g., from the lower operational amplifier 12), a sampling operation is carried out in the A/D converter 27. After the A/D conversion, the output of the A/D converter 27 is stored in the latch circuit 28b. Thus, a tracking servo circuit is formed.

Figure 6:
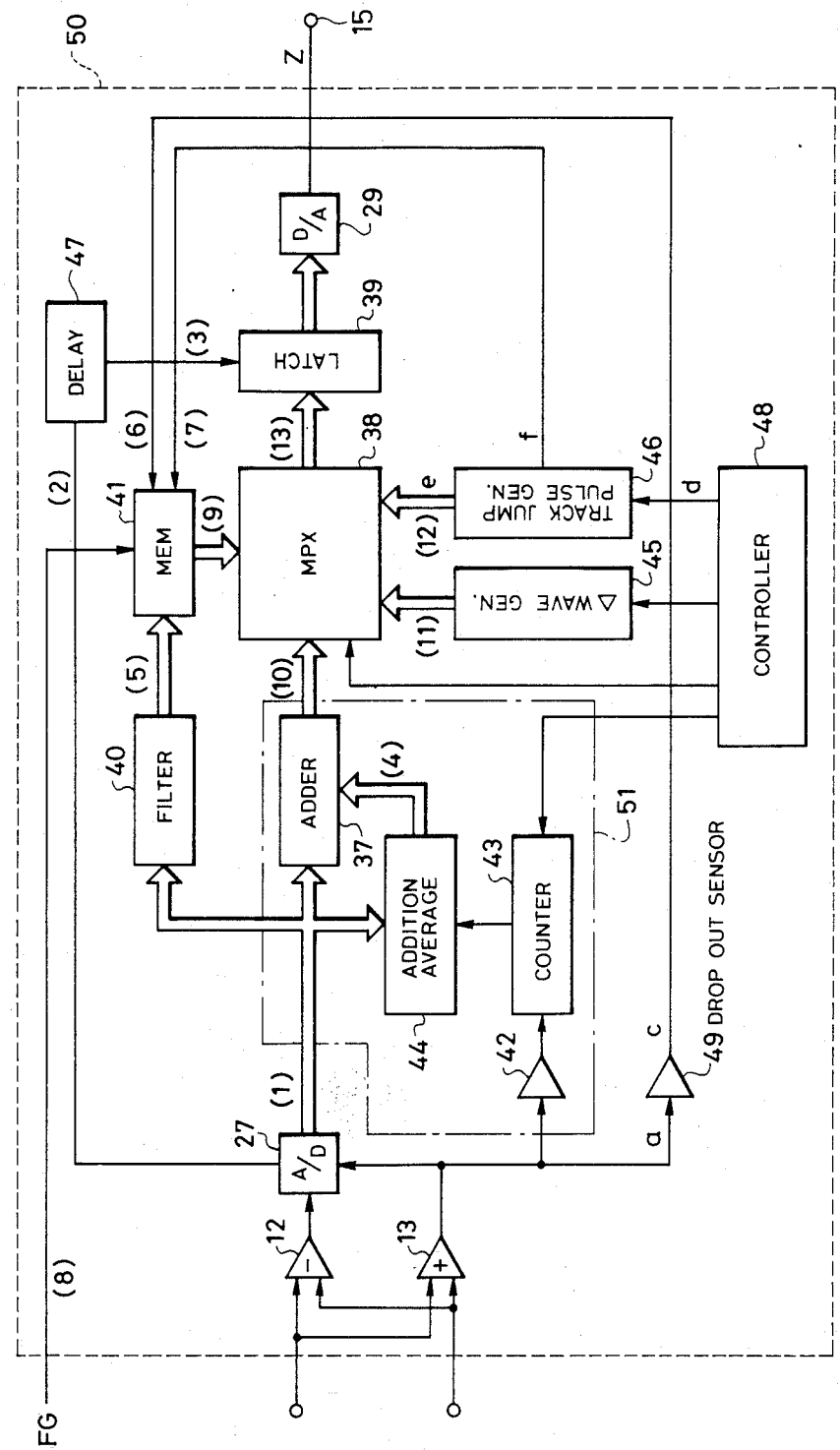
FIG. 6 is a block diagram of a second embodiment of the present invention.

In FIG. 6, reference numeral 37 designates an adder for adding an offset value (described below) to the output (identified as (1) in FIG. 6) of the abovedescribed A/D converter 27. The multiplexer 38 switches a main loop, a memory 41 (described below), a triangular wave generating circuit 45 (described below) and a track jump pulse generating circuit 46 (described below). In the following, the numbers in parentheses identify the waveforms shown in FIG. 8. The multiplexer 38 provides an output signal (13). In FIG. 6 reference numeral 39 designates a latch circuit and reference numeral 47 designates a delay circuit using a one-shot multivibrator. The latch circuit 39 receives an output (3) of the delay circuit 47 which receives an output (2) from the A/D converter 27. A filter 40 removes harmonic components included in the output of the abovedescribed A/D converter 27. The memory 41 stores the output (5) of the filter 40 in accordance with the outputs (6) and (7) of the track jump pulse generating circuit 46 and a drop out sensor 49 (described below). The output is stored in synchronization with the rotation of the disk. More specifically, the disk is rotated by a disk drive motor which is provided with a rotary encoder, so that the output of the rotary encoder controls the rotation speed of the drive motor. A counter in the memory 41 operates to count the output signal of the rotary encoder in order to store the output signal from the A/D converter 27, which represents the position on the disk. As a result, it is possible to store the output signal of the A/D converter 27 at an address corresponding to an aimed position on the disk. In this case, the counter is adapted to be reset when it counts the number of pulses generated in correspondence to one rotation of the rotary encoder. Therefore, the address corresponding to an aimed point on the disk is always made same. The output (9) of the memory 41 is connected to the multiplexer 38. Reference numeral 42 designates a peak detecting circuit which detects the time at which the sum output of the adder 13 reaches a peak value. A counter 43 counts, for example, until the peak time is detected. An addition average circuit 44 latches the output (1) of the A/D converter 27 at the peak time, for as many times as set by the counter 43 and subjects the latched (1) outputs to addition averaging so as to provide an offset value (4). The triangular wave generating circuit 45 and the track jump pulse generating circuit 46 are connected to the multiplexer 38 to respectively provide outputs (11) and (12) thereto. The counter 43 and the generating circuits 45 and 46 are controlled by a controller 48.

The above described multiplexer 38, memory 41 and generating circuits 45 and 46 represent, for example, a switching means, a memory means and signal generating means of the servo circuit of the present invention. The peak detecting circuit 42, the counter 43, the addition average circuit 44 and the adder 37 form an offset correcting means 46 to produce an output (10) shown in FIG. 6. These circuit elements are provided between the A/D converter 27 and the D/A converter 29; thus, forming signal processing means 50 in the circuit of the present invention.

Figure 7:
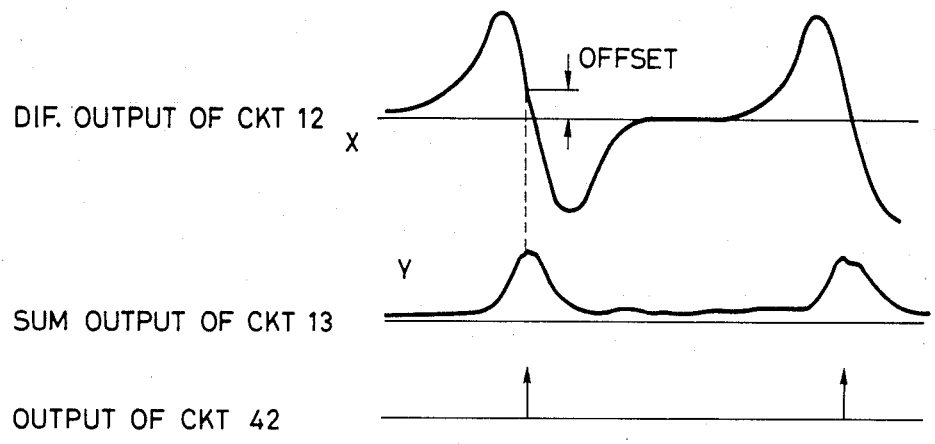
FIG. 7 is a waveform illustrating the principle of detecting an offset value.

FIG. 7 is a waveform illustrating the principle of detecting an offset value provided by the photodetectors (error sensors). The sum output of the photodetectors is at a maximum (peak) when, in the case of automatic focusing, the lens is focused on the object; and when, in the case of automatic tracking, the optical spot is at the track center. In these two conditions, the difference output of the photodetectors must be 0 (zero). Therefore, if, when the peak value of the sum output is detected, the difference output is read, an offset value representing a difference from zero can be obtained.

The servo circuit of the present invention automatically compensates for any offset value as described below. The triangular wave generated by the triangular wave generating circuit 45 is applied through the multiplexer 38, causing the servo system to move the reflecting plate 17 and thus move the laser beam with respect to the midpoint between photodetectors 19 and 20. With the beam thus moved, the peak value of the sum output of the photodetector is detected by the peak detecting circuit 42. When the peak value is detected, the signal (1) (which is the digitized difference output) is latched by the addition average circuit 44. The operation of latching the difference output, at the time a peak of the sum output occurs, is repeated, for example, eight times depending upon the value in the counter 43. The difference outputs (1) thus latched are averaged by the addition average circuit 44 to provide the offset value (4). During actual operation of the circuit, the stored (i.e., averaged) offset value is applied to the main loop through adder 37 compensate for an offset in the difference signal.

The function of the memory 41 is described below. The servo signal (1) (obtained by digitizing the difference output) is applied to the filter 40 to eliminate the harmonic components therefrom. The output (5) of the filter 40 is stored in the memory 41 synchronously with the rotation of the disk.

Figure 8:
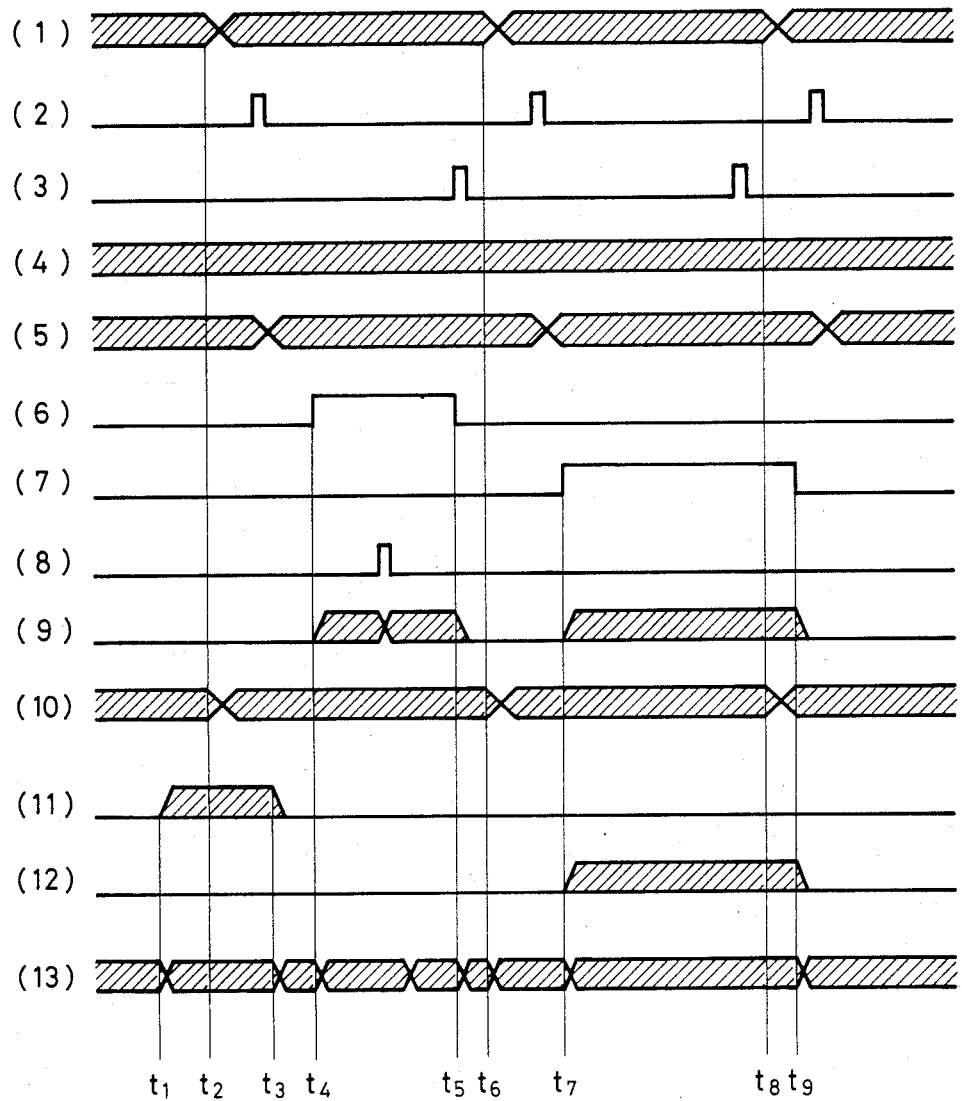
FIG. 8 is a waveform diagram showing outputs (1) to (13) shown in FIG. 6.

FIG. 8 is a waveform diagram showing outputs (1) to (13) described above. In FIG. 8, the part of (8) shows the waveform of the output (8) representing a signal for renewing an address data. The signal may be produced upon detection of a certain rotation speed of a driving motor of the optical disk or may be stored at a certain position of the optical disk in advance.

Figure 9:
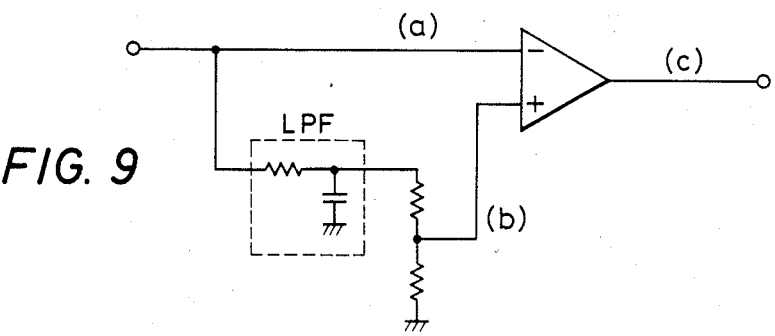
FIG. 9 is a circuit diagram showing an example of a drop out sensor.
Figure 10:
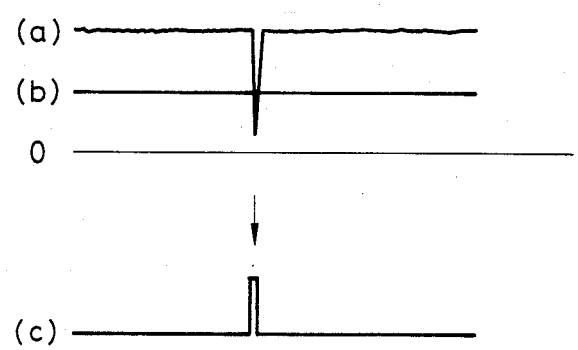
FIG. 10 is a waveform diagram showing waveforms of signals shown in FIG. 9.

FIG. 9 is a circuit diagram showing an example of the drop out sensor 49 and FIG. 10 is a waveform diagram showing the waveforms of signals (a) to (c).

A drop out occurs because, for instance, of a scratch on the optical disk which causes scattering or absorption of the laser beam at the surface of the optical disk. The occurrence of the drop out can be detecting by detecting an abrupt decreasing of the sum output representing the total amount of reflected lights. Accordingly, as shown in FIG. 9, the sum output is applied to a low-pass filter to detect an average level of the signal. The output of the low-pass filter is subjected to voltage division to obtain a signal (b) and then the signal (b) is compared with the sum output so as to produce an output signal (c) representing an occurrence of the drop output.

If the drop out is detected by the frop out sensor 49, the servo signal is very irregular, causing errors in the servo circuit operation. If, in this case, the servo signal in the memory 41 is applied through the multiplexer 38, then significant errors in the servo operation are avoided, because the disk's state stored at about one prior revolution is used as the signal (1).

Similar processing can occur when the laser beam jumps over adjacent tracks in response to a jumping pulse signal which is generated upon reception of a jump instruction signal from the controller 48. The jumping pulse signal is an acceleration/deceleration pulse signal so that the movement of the laser beam is accelerated to the mid-point of the adjacent tracks, and then decelerated. During the jumping operation, the jumping pulse signal is superposed on an ordinary drive signal. As a result, errors due to the jumping operation are avoided by the application of the data of the memory 41.

The servo signal thus obtained is applied to the latch circuit 39 where its timing is adjusted. The latch pulse is obtained by delaying the output (2) representing completion of A/D conversion by a period of time required for digital processing in the following circuits such as the adder 37, multiplexer 38 and the like. The period of time is in the range of about 50 to 500 ns for instance. The output of the latch circuit 39 is converted into an analog signal by the D/A converter 29.

While the invention has been described with reference to an optical disk (including a video disk and a compact disk), the technical concept of the invention is applicable to a servo circuit for a magnetic disk or any other servo circuit. In addition, the embodiments of the present invention described above serve to illustrate the present invention, those skilled in the art will recognize many modifications and variations thereof. The scope of the present invention is not limited by the disclosed embodiments, and instead is defined by the following claims.

What is claimed is:

1. A servo circuit comprising:
    positioning actuator means for moving an object in response to a servo signal;
    detector means, having a plurality of outputs, for varying a first set of said outputs in accordance with the position of the object;
    signal processing means for receiving said outputs of said detector means, for digitally processing said first set of outputs such that a sum of said first set of outputs normalizes a difference of said first set of outputs and for providing the servo signal varying in accordance with said processing of said first set of outputs, said signal processing means including
        A/D conversion means for converting an analog input to digital form in accordance with said sum of said first set of outputs and for providing, as a digital output, the digital form of said analog input, a digital form of said difference of said first set of outputs corresponding to said servo signal, and
        means for providing said difference of said first set of outputs to said analog input; and
    additional positioning actuator means for moving an additional object in response to an additional servo signal, and wherein
    said detector means comprises means for varying a second set of said plurality of outputs in accordance with the position of said additional object, and wherein
    said means for providing comprises time division switching means for selectively providing said difference of said first set of outputs and a difference of said second set of outputs to said analog input of said A/D conversion means, such that a digital form of said differences of said second set of outputs corresponds to said additional servo signal.

2. A servo circuit according to claim 1, wherein said signal processing means further comprises:
    offset correcting means for detecting an offset in said output of said A/D conversion means when said sum of said first set of outputs is at a peak value, and for adding the detected offset to said output of said A/D conversion means.

3. A servo circuit according to claim 2, wherein said offset correcting means comprises:
    signal generating means for varying the position of said object and said additional object by a predetermined amount of variation; and
    means for obtaining an average value of said output of said A/D conversion means when said sum of said first set of outputs is at a peak value, said average value corresponding to said detected offset.

4. A servo circuit according to claim 3, wherein said signal processing means further comprises:
    memory means for storing the output of said A/D conversion means, and for selectively providing said stored output as said servo signal in response to the output of said A/D conversion means being erroneous.

5. A servo circuit according to claim 4, wherein said signal processing means further comprises:
    D/A conversion means for converting said servo signal and said additional servo signal into analog form.

* * * * *